United States Patent [19]

Sievers

[11] Patent Number: 4,808,240
[45] Date of Patent: Feb. 28, 1989

[54] STACKED VAPOR FED AMTEC MODULES

[75] Inventor: Robert K. Sievers, North Huntingdon, Pa.

[73] Assignee: The United States of America as represented by the United States Department of Energy, Washington, D.C.

[21] Appl. No.: 95,384

[22] Filed: Sep. 8, 1987

[51] Int. Cl.$^4$ .......................................... H01L 37/00
[52] U.S. Cl. .................... 136/202; 136/212
[58] Field of Search ................................ 136/202, 212

[56] References Cited

U.S. PATENT DOCUMENTS

| 3,897,271 | 7/1975 | Kim | 136/202 |
| 3,931,532 | 1/1976 | Byrd | 136/202 X |
| 4,338,560 | 7/1982 | Lemley | 136/202 X |

OTHER PUBLICATIONS

Sodium Heat Engine/AMTEC System Experiments, T. K. Hunt, J. U. Lasecki, R. F. Novak, J. R. McBride and J. T. Brockway, Ford Motor Company, 4th Space Nuclear Power Conf., Jan. 5, 1987.
Research on the Sodium Heat Engine, T. K. Hunt, Neill Weber and Terry Cole, Ford Motor Company, SAE/P-78/75, 1978.
Alkali Metal Thermoelectric Conversion (AMTEC), Technology Status Review by C. P. Bankston, 3rd Symposium on Space Nuclear Power Systems.
Research Program on the Sodium Heat Engine, Phase 4 Final Report 1986, DOE/CE-40651-1.

*Primary Examiner*—Peter A. Nelson

[57] ABSTRACT

The present invention pertains to a stacked AMTEC module. The invention includes a tubular member which has an interior. The member is comprised of a ion conductor that substantially conducts ions relative to electrons, preferably a beta"-alumina solid electrolyte, positioned about the interior. A porous electrode for conducting electrons and allowing sodium ions to pass therethrough, and wherein electrons and sodium ions recombine to form sodium is positioned about the beta"-alumina solid electrolyte. The electrode is operated at a temperature and a pressure that allows the recombined sodium to vaporize. Additionally, an outer current collector grid for distributing electrons throughout the porous electrode is positioned about and contacts the porous electrode. Also included in the invention is transporting means for transporting liquid sodium to the beta"-alumina solid electrolyte of the tubular member. A transition piece is positioned about the interior of the member and contacts the transporting means. The transition piece divides the member into a first cell and a second cell such that each first and second cell has a beta"-alumina solid electrolyte, a first and second porous electrode and a grid. The transition piece conducts electrons from the interior of the tubular member. There is supply means for supplying sodium to the transporting means. Preferably the supply means is a shell which surrounds the tubular member and is operated at a temperature such that the vaporized sodium condenses thereon. Returning means for returning the condensed sodium from the shell to the transporting means provides a continuous supply of liquid sodium to the transporting means. Also, there are first conducting means for conducting electric current from the transition piece which extends through the shell, and second conducting means for conducting electric current to the grid of the first cell which extends through the shell.

18 Claims, 6 Drawing Sheets

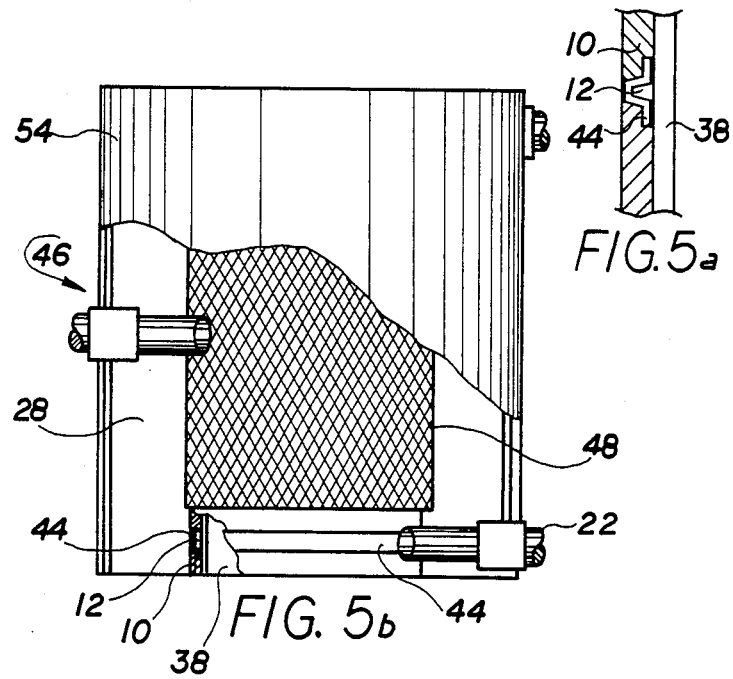
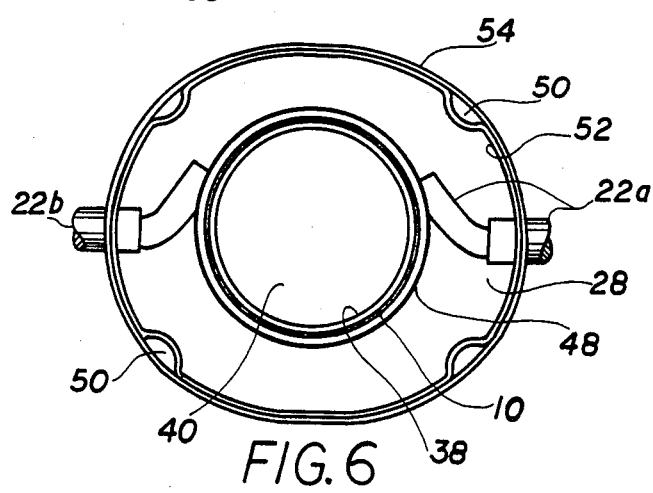

STACKED VAPOR FED AMTEC MODULES

GOVERNMENT CONTRACT

The government of the United States of America has rights related to the invention described and claimed in this application pursuant to Contract No. DE-AC03-86SF16503 awarded by the Department of Energy.

FIELD OF THE INVENTION

The present invention relates to alkali metal thermoelectric converters. More specifically the present invention relates to a stacked vapor fed alkali metal thermoelectric convertor module.

BACKGROUND OF THE INVENTION

Thermoelectric converters, which directly convert heat into electrical energy without moving parts, have found applications where simplicity and high reliability are desired. The efficiency of these devices, however, typically is less than 10%.

One system with great potential for higher efficiencies is the alkali metal thermoelectric converter (AMTEC). Current estimates of potential efficiency of energy conversion range from 20 to 40%. See Terry Cole "Thermoelectric Energy Conversion With Solid Electrolytes", *Science.* Vol. 221, Num. 4614, Sept. 2, 1983.

A prior art AMTEC (also called sodium heat engine) is shown in FIG. 1. The AMTEC design typically requires a condenser shell within which there is disposed a beta"-aluminum solid electrolyte (BASE) tube. The BASE tube structure is filled with liquid sodium which provides sodium ions and electrons. As currently generally understood, the sodium ions are able to pass through the BASE tube structure but the electrons are not. The electrons instead are carried outside of the tube by way of an external circuit with a load. The sodium ions and electrons recombine in a porous electrode that surrounds the BASE tube that is connected to the external circuit. The electrons return to the electrode through an outer grid that is distributed over the electrode. The recombined sodium in the electrode vaporizes along the outer surface of the electrode and travels to a condenser shell where it condenses and collects under the force of gravity in a condensate pool at the bottom of the shell. A pump takes the liquid sodium in the condensate pool and feeds it back into the BASE tube with additional heat energy added. See, T. K. Hunt, Neill Weber and Terry Cole, "Research on the Sodium Heatengine", SAE/P-78/75, 1978.

Most AMTEC units have typically used a 30 cm × 1.5 cm (I.D.) BASE tube. The power output of these tubes is small, with a range from 50 to 100 watts at approximately 0.5 volts, depending on unit efficiency. Higher power outputs have been achieved, but only by connecting several low power units or tubes together. In one design that achieves several kilowatts of power, six BASE tubes are arranged in two sets (in electrical parallel) of three (in electrical series) around a single heater well. See, T. K. Hunt, J. V. Lasecki, R. F. Novak, J. R. McBride and J. T. Brockaway, "Sodium Heat Engine/AMTEC System Experiments" 4th Space Nuclear Power Conference, Jan., 1987; Research Progress on the Sodium Heat Engine Phase 4, Final Report, DOE/CE/40651-1, 1986, respectively. The heater well supplies thermal energy by radiation heat transfer to the surrounding BASE tubes. This is somewhat different than the approach suggested earlier in which thermal energy is supplied directly to the inside of the BASE tube, but allows for a simpler design by reducing the number of heat transport paths, supplying energy to several BASE tube through a single heat path (heater well).

There are some inherent disadvantages associated with the above approach to a high power density device in which more than 6 BASE tubes are employed. Each BASE tube, for example, must have a sodium supply tube. In a system with many BASE tubes there will be an extensive system of sodium delivery tubes. In addition, the arrangement of BASE tubes around the heater well is not space or thermally efficient. Each heater well occupies space that could be used for another BASE tube. In a triangular pitch arrangement 33% of the tube space would have to be given to heater wells. Also, the temperature drop between the heater well and the BASE tubes would result in a decrease in thermal efficiency. These disadvantages tend to limit the power density achievable.

In order to achieve high power in a compact, low mass, configuration and minimize the heat supply system, it is desirable to (1) supply thermal energy to the inside of the BASE tubes, thereby eliminating the temperature drop and space occupied by heater wells, and (2) use the maximum possible length of BASE tube to reduce the sodium supply complexity. As the BASE tube is made longer, however, it becomes increasingly difficult to provide sufficient thermal energy or working fluid to the inside of the BASE tube. Moreover, and more importantly, the components that provide the electron flow path, both inside and outside the BASE tube, must become larger to accommodate the increased net electrical current generated from the larger BASE tube surface area. But the components, by becoming larger, are then subjected to substantial ohmic ($I^2R$) power losses. At a given design length the cross-section of the sodium pool inside the BASE tube or the electron distribution grid outside the BASE tube required to keep ohmic losses less than the power generated exceeds the available space. These constraints limit even the unit length, power density, and minimum weight that can be achieved.

SUMMARY OF THE INVENTION

The present invention provides an AMTEC module having a much longer BASE tube than heretofore known and achieving much higher power outputs than were previously possible without the accompanying ohmic power losses that exist in the prior art AMTEC modules. The present AMTEC module achieves these advantages over the prior art by having a BASE tube which is divided into cells with transition pieces, and by having a wick lining the BASE tube and being supplied with liquid sodium through a sodium vapor transport system. The cells and transition pieces of the BASE tube allow the electric current produced by the AMTEC module to follow shorter current paths with a corresponding decrease in ohmic losses and in weight. The wick evenly distributes liquid sodium supplied by the sodium vapor transport system throughout the length of the BASE tube.

More specifically, the present invention pertains to a stacked AMTEC module including a tubular member comprising an interior and a ion conductor that substantially conducts ions relative to electrons and is positioned about the interior. A porous electrode for conducting electrons and allowing sodium ions to pass therethrough, and wherein electrons and sodium ions recombine to form sodium is positioned about the ion conductor. The electrode is also operated at a temperature and a pressure that allows the recombined sodium to vaporize. Additionally, an outer current collector grid for distributing electrons throughout the porous electrode is positioned about and in contact with the porous electrode. The invention also includes transporting means for transporting liquid sodium to the ion conductor. In addition, a transition piece is positioned about the interior of the member and contacts the transporting means. The transition piece divides the member into at least a first cell and a second cell such that each first and second cell has a ion conductor, a porous electrode and a grid as previously described. The transition piece conducts electrons from the interior of the tubular member to a first conducting means. Supply means is also provided for supplying sodium to the transporting means. First conducting means conducts electric current from the transition piece through the shell to an external circuit. Second conducting means also conducts electric current from the same or another external circuit to the grid of at least the first cell and preferably both the first and second cells through the shell.

In a preferred embodiment, the ion conductor that substantially conducts ions relative to electrons is a beta"-alumina solid electrolyte, and the supply means includes a shell which surrounds the tubular member and is operated at a temperature such that the vaporized sodium condenses thereon. Also, returning means for returning the condensed sodium from the shell to the transporting means provides a continuous supply of liquid sodium to the transporting means.

In an even more preferred embodiment, at least a first and a second AMTEC module, as described above, are connected in series with the first conducting means from the first AMTEC module electrically connected to the second conducting means of the second AMTEC module.

In an alternative more preferred embodiment, the first and second AMTEC modules, as described above, share a common shell. The first conducting means of the first AMTEC module is again electrically connected to the second conducting means of the second AMTEC module.

Other details, objects and advantages of the invention will become apparent as the following description of the presently preferred embodiments and presently preferred methods of practicing the invention proceeds.

BRIEF DESCRIPTION OF THE DRAWINGS

In the accompanying drawings, the preferred embodiments of the invention and preferred methods of practicing the invention are illustrated in which:

FIGS. 5a and 5b show details of an AMTEC module;

FIG. 6 is an overhead view of an AMTEC module cell;

DESCRIPTION OF THE PREFERRED EMBODIMENTS

Figure 2:
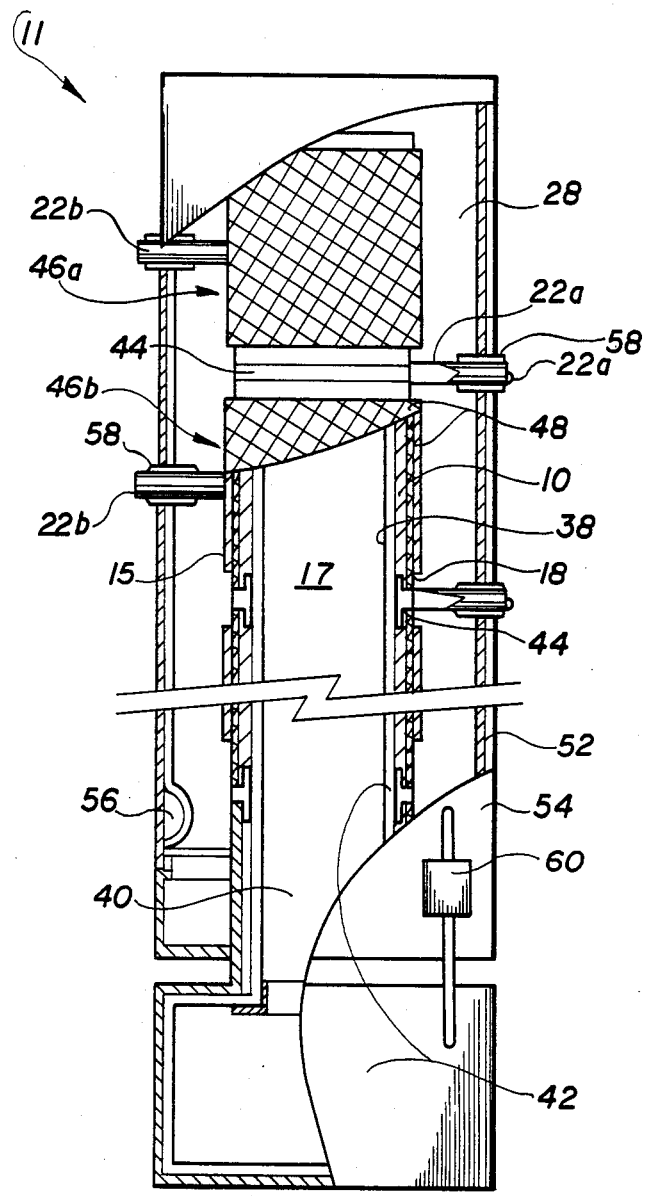
FIG. 2 is a cross-sectional view of a stacked vapor fed AMTEC module.
Figure 3:
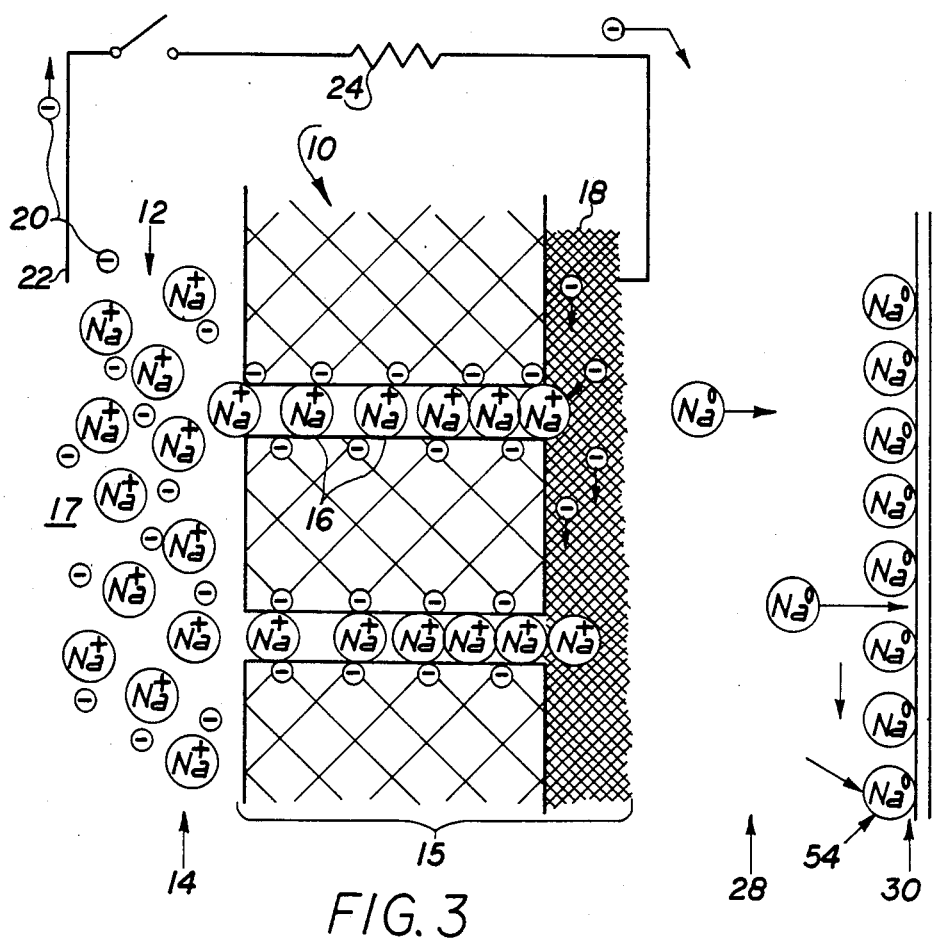
FIG. 3 is a schematic representation of the microscopic processes occurring in and around the ion conductor of an AMTEC module as presently understood.
Figure 4:
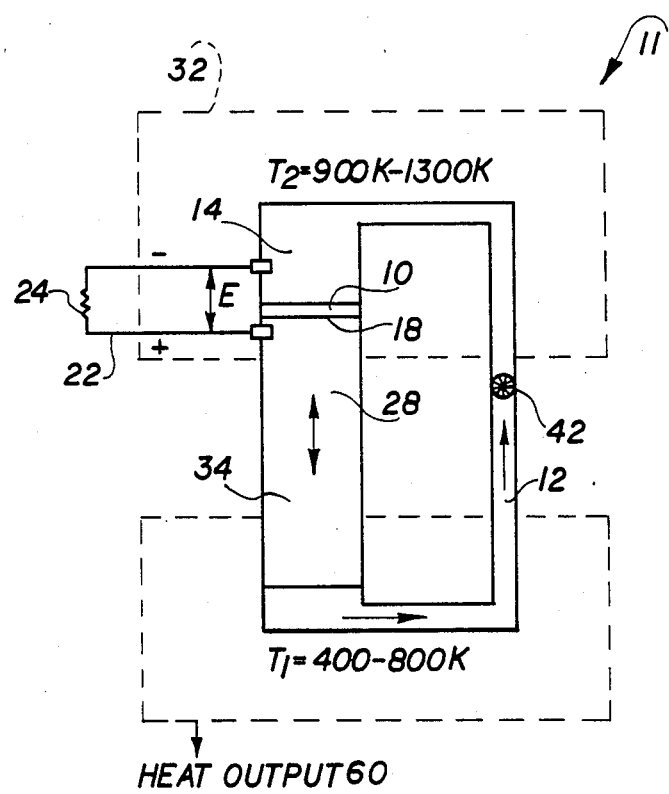
FIG. 4 is a schematic diagram of the operation of an AMTEC module.

Referring now to the drawings, and more particularly to FIGS. 2, 3 and 4 thereof, a stacked vapor fed AMTEC module 11 is shown. The AMTEC module 11 includes a tubular member 15 which has an interior 17 at a high pressure (typically 2 atm.). The tubular member 15 is comprised of a ion conductor 10 that substantially conducts ions relative to electrons, preferably a beta"-alumina solid electrolyte 10, positioned about the interior 17 which contains liquid sodium 12 that contacts the inner surface of the ion conductor 10. A porous electrode 18 is provided on the outer surface of the ion conductor 10 for conducting electrons 20 and allowing sodium ions 16 to pass therethrough and wherein electrons 20 and sodium ions 16 recombine in the low pressure region 28 (typically 0.1 atm. or less). The sodium which passed through the tubular member is vaporized in the low pressure region 28 which is positioned about the tubular member 15. Additionally, an outer current collector grid 48 for distributing electrons 20 throughout the porous electrode 18 is positioned about and contacts the porous electrode 18. Also included in the invention is transporting means 42 for transporting liquid sodium 12 to the ion conductor 10 of the tubular member 15. A transition piece 44 is positioned about the interior 17 of the tubular member 15 and contacts the transporting means 42. The transition piece divides the member 15 into a first cell 46A and a second cell 46B such that each first and second cell 46 has a ion conductor 10 a porous electrode 18 and a grid 48. The transition piece 44 conducts electrons 20 from the interior 17 of tubular member 15 to first conducting means 22a. There is supply means for supplying sodium to the transporting means 42. The supply means preferably includes a shell 54 which surrounds the tubular member 15 and is operated at a temperature such that the vaporized sodium 34 condenses thereon. The supply means also includes returning means 60 for returning the condensed low pressure sodium from the shell 54 to the transporting means 42 and provides for a continuous supply of liquid sodium 12 to the transporting means 42. First conducting means 22a conducts electric current 20 from the transition piece 44 through the shell 54 to an external circuit 21, and second conducting means 22b which extends through the shell 54 conducts electric current 20 from the same or a different external circuit to the grid 48 of the first cell 46a.

More specifically, and referring to FIG. 3, the AMTEC system preferably uses a beta"-alumina solid electrolyte (BASE) as the ion conductor 10 that substantially conducts ions relative to electrons. (The double prime (") associated with the beta"-alumina identifies the chemical form of beta-alumina which is an ion conductor. A beta"-alumina by definition herein is alumina electrolyte that functions as to substantially conduct ions relative to Electrons.)

Liquid sodium 12 is located on a high pressure side 14 of ion conductor 10. Thermal energy entering the high pressure side 14 raises the free energy state of the liquid sodium 12. The sodium ionizes and the positive sodium ions 16 pass radially through the conductor 10 to a porous electrode 18. The free electrons 20, from the ionized sodium travel along transition pieces 44 in contact with the liquid sodium 12 (the liquid sodium 12 is itself an electrical ion conductor), along first conducting means 22a, to an external circuit 24 and then through second conducting means 22b to the porous electrode 18 alongside the ion conductor 10. The sodium ions 16 that have passed through the ion conductor 10 recombine with the electrons 20 in the porous electrode 18 on the low pressure region 28. The recombined sodium now at a lower free energy on the low pressure regrim 28 vaporizes and travels to shell 54, which is at the low temperature, where it condenses.

An AMTEC module 11, utilizing the above described operation is schematically shown in FIG. 4. The AMTEC module 11 utilizes a closed cycle in which only thermal energy 32 is added. Thermal energy 32 enters at high pressure regrim 14 of the AMTEC module 11, raises the free energy state of the liquid sodium 12 and the liquid sodium 12 ionizes and passes through the ion conductor 10 to the porous electrode 18 at low pressure 28 of the AMTEC module 11. The free electrons from the ionized sodium are conducted through first and second conducting means 22a and 22b to the porous electrode 18 where they recombine with sodium ions that have passed through the ion conductor. The high temperature sodium atoms vaporize in the low pressure region 28, travel as a vapor 34 to the low temperature region 30 along shell 54 and condense on shell 54. The liquid sodium 12 is then collected and returned to the high pressure region 14 through a return means 60 such as a pump.

Figure 1:
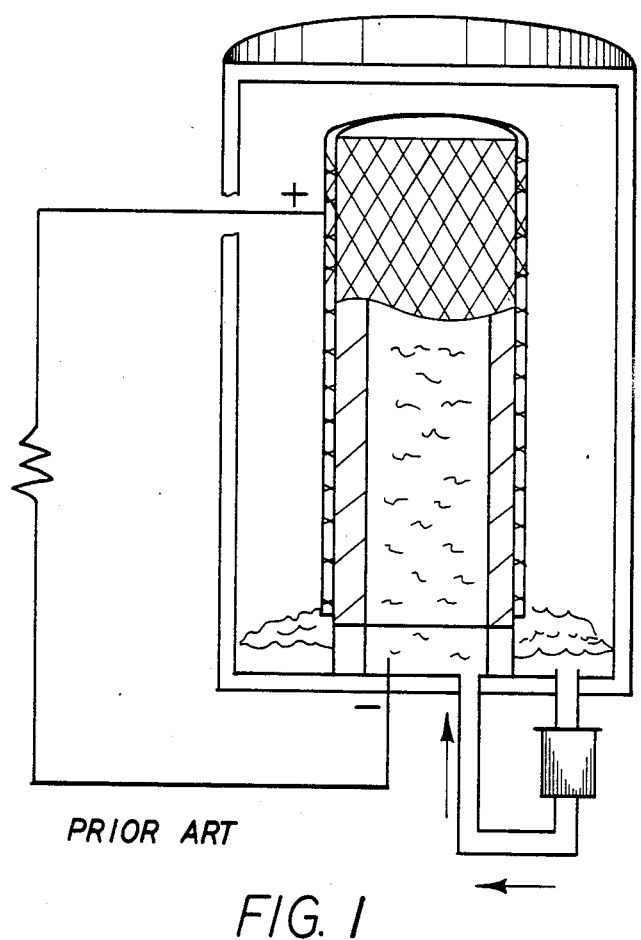
FIG. 1 is a cross-sectional view of a prior art AMTEC module.

The AMTEC module 11, shown in FIG. 1 preferably uses a thin (1.0–1.5 mm) tubular ion conductor 10, which preferably has a thin metal (2–3 microns) porous electrode 18 deposited on its outer surface. There are several advantages to this configuration. The thin walls, for example, minimize the ionic resistance of the ion condctor 10. Also, the tubular geometry is relatively easy to manufacture, provides a geometry suitable for withstanding the surface pressure loads, and requires only a low pressure seal.

The AMTEC module 11 employing the features of the present invention achieve a higher power density per unit volume and mass than heretofore known. Transporting means 42 is preferably a vapor transport system that includes an evaporator and an inner wick 38. The vapor transport system is used to provide the thermal energy to the ion conductor 10. The thin porous inner wick 38 preferably lines the tubular member 15 of the AMTEC module 11 and in combination are known as a vapor feed tube 40. The inner wick 38, which is filled with sodium, also is electrically conductive and serves as a current collector. The liquid sodium 12 is provided to the inner wick 38 by vaporization of the liquid sodium 12 in the evaporation and subsequent conductors on the inner wick 38. More specially, the evaporator supplies the thermal energy to the sodium, the liquid sodium is vaporized and travels through the interior of the tubular member 15 and then condenses along the entire length of the inner wick 38. This condensed sodium is then used in the thermoelectric process (passing through the ion conductor 10) described above, or, if surplus, is returned back to the evaporator 42. By supplying sodium to the ion conductor 10 tubular member of lengths of 5–10 m can be achieved and electrical energy production of 10 kW/cm$^2$ can be achieved. Also, unlike prior act AMTEC modules, the present AMTEC module is not dependent on gravity to operate greatly expanding the flexibility of operation.

More importantly, the present AMTEC module 11 ion conductor 10 must be provided with a low resistance path for electrons 20 to be conducted to external circuit 24. The large net electrical current of the present AMTEC module is provided by extracting the electrons 20 that collect in the inner wick 38 and sodium 12 through electrically conductive transition pieces 44 positioned at intervals along the length of the ion conductor 10 lining vapor feed tube 40. Transition pieces 44 preferably are positioned along inner wick 38 and divide the ion conductor 10, porous electrode 13 and the grid 48 into cells, as detailed in FIGS. 5a and 5b. Preferably, transition pieces 44 are spaced every 20–40 cm along the ion conductor 10. The electrons 20 in inner wick 38 travel to the closest transition piece 44 where they are carried to the external circuit 24 by first conducting means 22a which is connected to the transition piece 44. Second conducting means 22b is connected to grid 48 of cells to return the electrons 20 from the external circuit to the porous electrode 18. The grid 48, which is of electrically conducting material, essentially overlays the surface of porous electrode 18 of each cell to the greatest extent to maximize the distribution of the electrons and recombination with the sodium ions 16 that have passed through the ion conductor 10. Since each cell handles only a fraction of the total current generated along the ion conductor 10, current densities in the AMTEC module can be held to a level in which ohmic losses are relatively small compared to the total power output.

Recombined sodium collected in the porous electrode is removed by vaporization at low pressure region 28 and flow to cooler outer wick 52 where they condense. Insulator means 58 electrically isolate first and second conducting means 22a and 22b from shell 54 and outer wick 52 and extend inward from shell 54 toward ion conductor 10 to keep sodium vapor 34 from condensing on conducting means 22a and 22b. Also, preferably, to assist in the flow of condensed sodium back to collector 56 condensate arteries 50 are formed between outer wick 52 and shell 54 of module 11 and extend the length of the shell 54 to adjacent condensate collector 56. Return means 60, for instance an electromagnetic pump, then returns the sodium from collector 56 to the high pressure evaporator.

Figure 7:
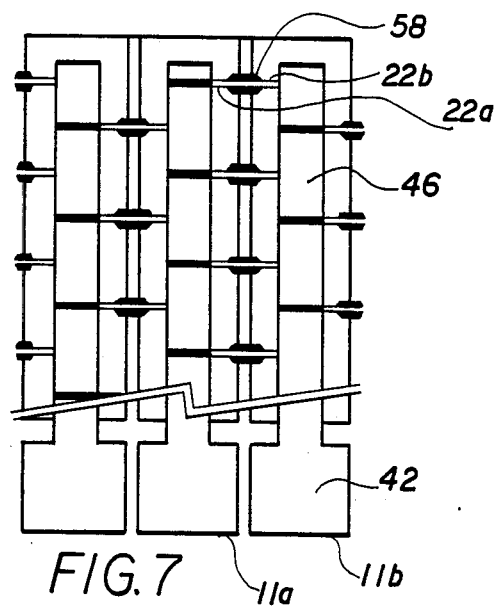
FIG. 7 is a cross-sectional view of several single AMTEC modules in series having their own shells.

AMTEC module 11 are preferably used in series to increase voltage. Shown in FIG. 7 is a series of modules 11 joined together to provide a greater voltage for a given electrical current. To make the series connection, the first conducting means 22a of one module is connected to the second conducting 22b of the next adjustment module. As shown in FIG. 7, the alignment of cells 46 in alternate modules 11 have preferably been staggered to provide for simple electrical connections between modules.

Figure 8:
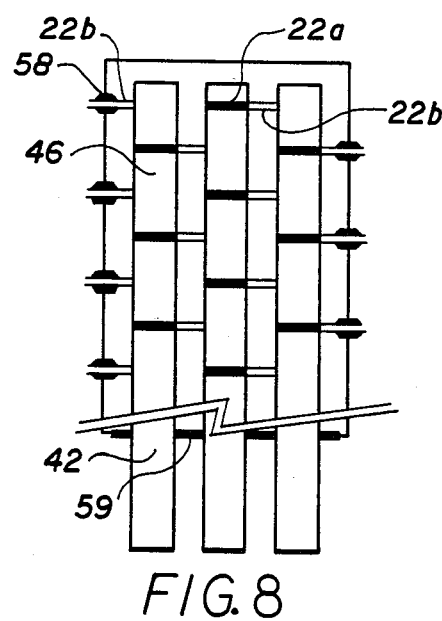
FIG. 8 is a cross-sectional view of several single AMTEC modules in series having a common shell.

In an alternative embodiment as shown in FIG. 8, AMTEC modules of the present invention can be connected in series in a single shell to reduce volume and mass. This requires the use of, for example, a ceramic insulator 54, between the evaporators and common shell 54 to prevent an electrical short circuit of the system. In such an embodiment, the sodium vapor 34 formed condenses on the single common shell 54, having essentially the same features as previously described.

Although the invention has been described in detail in the foregoing for the purpose of illustration, it is to be understood that such detail is solely for that purpose and that variations can be made therein by those skilled in the art without departing from the spirit and scope of the invention as described in the following claims.

What is claimed is:

1. A stacked AMTEC module comprising:
   a tubular member having an interior, said member comprised of
      a beta"-alumina solid electrolyte positioned about the interior;
      a porous electrode for conducting electrons and allowing sodium ions to pass therethrough and wherein electrons and sodium ions recombine to form sodium, said electrode positioned about the beta"-alumina solid electrolyte, said electrode capable of being at a temperature and pressure that allows sodium to vaporize; and
      an outer current collector grid for distributing electrons throughout the porous electrode, said grid positioned about and contacting the porous electrode;
   transporting means for transporting liquid sodium to the beta"-alumina solid electrolyte of the member;
   a transition piece is positioned about the interior of the tubular member and contacts the transporting means to allow liquid sodium and electrons to be transported to the transition piece from the transporting means, said transition piece divides the tubular member into a first cell and a second cell such that each first and second cell has a beta"-alumina solid electrolyte, a porous electrode and a grid;
   supply means for supplying sodium to the transporting means;
   first conducting means for conducting electrons from the transition piece, said first conducting means extending through the shell; and
   second conducting means for conducting electrons to the grid of the first cell, said second conducting means extending through the shell.

2. A stacked AMTEC module as described in claim 1 wherein the supply means includes a shell surrounding the tubular member and capable of operating at a temperature such that vaporized sodium condenses thereon.

3. A stacked AMTEC module as described in claim 2 wherein the supply means includes returning means for returning the condensed sodium from the shell to the transporting means.

4. A stacked AMTEC module as described in claim 3 wherein the transporting means includes a pump means connected to a supply of liquid sodium and capable of supplying liquid sodium to the interior of the tubular member.

5. A stacked AMTEC module as described in claim 2 wherein the transporting means includes an evaporator means for providing evaporated sodium to the interior of the tubular member.

6. A stacked AMTEC module as described in claim 5 wherein the transporting means includes an inner wick upon which evaporated sodium is capable of condensing, said inner wick being in the interior of the tubular member and contacting the beta"-alumina solid electrolyte and the transition piece.

7. A stacked vapor fed AMTEC module comprising:
   a shell;
   a vapor fed tube being capable of being at a first temperature and a first pressure allowing evaporated sodium to condense thereon, said tube located within the shell;
   an inner wick for transporting liquid sodium and collecting electric current, said inner wick in the vapor feed tube;
   a member is positioned about the inner wick, said member comprising
      a beta"-alumina solid electrolyte is positioned about the inner wick;
      a porous electrode for conducting electrons and allowing sodium ions to pass therethrough and wherein electrons and sodium ions recombine to form sodium, said electrodes positioned about the beta"-alumina solid electrolyte, said porous electrode being capable of being at a second temperature and a second pressure lower than the first temperature and first pressure in the vapor tube and allowing sodium to vaporize; and
      an outer current collector grid for distributing electrons throughout the porous electrode, said grid being positioned about and contacting the porous electrode;
   a transition piece is positioned about and contacts the inner wick and divides the member into a first cell and a second cell such that each first and second cell has a beta"-alumina solid electrolyte, a porous electrode and a grid, said transition piece conducting electrons from the inner wick;
   an outer wick for transporting liquid sodium, said outer wick being positioned in the shell and being capable of being at a third temperature lower than the second temperature of the porous electrode and allowing vaporized sodium to condense thereon;
   transporting means for providing evaporated sodium to the vapor feed tube;
   returning means for returning liquid sodium from the outer wick to the transporting means; and
   first conducting means for conducting electric current from the transition piece, said first conducting means extending through the shell; and
   second conducting means for conducting electric current to the grid of the first cell, said second conducting means extending through the shell.

8. A stacked vapor fed AMTEC module as described in claim 7 wherein the transporting means is an evaporator connected to feed sodium to the vapor feed tube.

9. A stacked vapor fed AMTEC module as described in claim 8 wherein the returning means includes a condensate collector which collects sodium from the outer wick and a pump means disposed in the condensate collector and fluidically connected to the evaporator for pumping the liquid sodium from the outer wick to the evaporator.

10. A stacked vapor fed AMTEC module as described in claims 4, 6 or 9 wherein the means for conducting electrons includes electrical leads electrically connected to the transition piece and extending out through the shell and back into the shell and contacting the grid, and insulator means disposed in and extending through the shell through which the leads are disposed and electrically isolated from the shell.

11. An AMTEC assembly comprising:
   a first stacked AMTEC module and a second stacked AMTEC module, said first and second AMTEC modules each comprised of:

a tubular member with an interior, said member comprised of
- a beta"-alumina solid electrolyte positioned about the interior;
- a porous electrode for conducting electrons and allowing sodium ions to pass therethrough and wherein electrons and sodium ions recombine to form sodium, said electrode positioned about the beta"-alumina solid electrolyte, said electrode being capable of being at a temperature and pressure that allows the recombined sodium to vaporize; and
- an outer current collector grid for distributing electrons throughout the porous electrode, said grid positioned about and contacting the porous electrode;

means for transporting liquid sodium to the beta"-alumina solid electrolyte of the member;

a transition piece is positioned about the interior of the member and contacts the transporting means to allow liquid sodium to be transported to transporting means, said transition piece divides the member into a first cell and a second cell such that each cell has a beta"-alumina solid electrolyte, a porous electrode and a grid, said transition piece conducting electrons from the transporting means;

a shell surrounding the member and capable of being at a temperature such that the vaporized sodium condenses thereon;

condenser means for returning the condensed sodium from the shell to the transporting means;

first conducting means for conducting electrons from the transition piece, said first conducting means extending through the shell; and second conducting means for conducting electrons to the grid of the first cell and to the grid of the second cell, said second conducting means extending through the shell with the first conducting means of the first AMTEC module being electrically connected to the second conducting means of the second AMTEC module.

12. An AMTEC assembly as described in claim 11 including a third AMTEC module comprised of:

a tubular member with an interior, said member comprised of
- a beta"-alumina solid electrolyte positioned about the interior;
- a porous electrode for conducting electrons and allowing sodium ions to pass therethrough and wherein electrons and sodium ions recombine to form sodium, said electrode positioned about the beta"-alumina solid electrolyte, said electrode being capable of being at a temperature and pressure that allows the recombined sodium to vaporize; and
- an outer current collector grid for distributing electrons throughout the porous electrode, said grid positioned about and contacting the porous electrode;

means for transporting liquid sodium to the beta"-alumina solid electrolyte of the member;

a transition piece is positioned about the interior of the member and contacts the transporting means to allow liquid sodium to be transported to transporting means, said transition piece divides the member into a first cell and a second cell such that each cell has a beta"-alumina solid electrolyte, a porous electrode and a grid, said transition piece conducting electrons from the transporting means;

a shell surrounding the member and capable of being at a temperature such that the vaporized sodium condenses thereon;

condenser means for returning the condensed sodium from the shell to the transporting means;

first conducting means for conducting electrons from the transition piece, said first conducting means extending through the shell; and second conducting means for conducting electrons to the grid of the first cell and to the grid of the second cell, said second conducting means extending through the shell with the first conducting means of the second AMTEC module being electrically connected to the second conducting means of the third AMTEC module..

13. An AMTEC assembly comprising:

a first tubular member and a second tubular member, said first and second tubular members each having an interior and being comprised of
- a beta"-alumina solid electrolyte positioned about the interior;
- a porous electrode for conducting electrons and allowing sodium ions to pass therethrough and wherein electrons and sodium ions recombine to form sodium, said electrode positioned about the beta"-alumina solid electrolyte, said electrode being capable of being at a temperature and pressure that allows the recombined sodium to vaporize; and
- an outer current collector grid for distributing electrons throughout the porous electrode, said grid positioned about and contacting the porous electrode;

means for transporting liquid sodium to the beta"-alumina solid electrolyte of the member;

a transition piece is positioned about the interior of the member and contacts the transporting means to allow liquid sodium to be transported to transporting means, said transition piece divides the member into a first cell and a second cell such that each cell has a beta"-alumina solid electrolyte, a porous electrode and a grid, said transition piece conducting electrons from the transporting means;

a shell surrounding the first and second members and capable of being at a temperature such that the vaporized sodium condenses thereon;

condenser means for returning the condensed sodium from the shell to the transporting means;

first conducting means for conducting electrons from the transition piece of the first member;

second conducting means for conducting electrons to the grid of the first cell of the second member and being electrically connected to the first conducting means of the first member;

third conducting means for conducting electrons from the transition piece of the second member, said third conducting means extending through the shell; and fourth conducting means for conducting electrons to the grid of the first cell of the first member, said fourth conducting means extending through the shell.

14. An AMTEC assembly as described in claim 10 including a third tubular member having an interior, said third tubular member disposed in the shell and being comprised of a beta"-alumina solid electrolyte positioned about the interior;

a porous electrode for conducting electrons and allowing sodium ions to pass therethrough and wherein electrons and sodium ions recombine to form sodium, said electrode positioned about the beta"-alumina solid electrolyte, said electrode being capable of being at a temperature and pressure that allows the recombined sodium to vaporize; and an outer current collector grid for distributing electrons throughout the porous electrode, said grid positioned about and contacting the porous electrode;

said means for transporting liquid sodium also transporting liquid sodium to the beta"-alumina solid electrolyte of the third member;

a transition piece is positioned about the interior of the third member and contacts the transporting means to allow liquid sodium to be transported to transporting means, said transition piece divides the third member into a first cell and a second cell such that each cell has a beta"-alumina solid electrolyte, a porous electrode and a grid, said transition piece conducting electrons from the transporting means;

fifth conducting means for conducting electrons from the transition piece of the third tubular member, said fifth conducting means extending through the shell; and sixth conducting means for conducting electrons to the grid of the first cell of the third member, said sixth conducting means electrically connected to the third conducting means of the second member.

15. An AMTEC assembly as described in claims 11, 12, 13 or 14 wherein the transporting means includes a pump means fluidically connected to the interior of each member and a pool of liquid sodium filling the interior of each member.

16. An AMTEC assembly as described in claims 11, 12, 13 or 14 wherein the transporting means includes an evaporator for providing evaporated sodium fluidically connected to the interior of each member, and each member having an inner wick upon which the evaporated sodium condenses, each of said inner wicks being positioned about the interior of each member and contacting the beta"-alumina solid electrolyte and the transition piece of each member.

17. A stacked AMTEC module comprising:

a tubular member having an interior, said member comprised of
 an ion conductor that substantially conducts ions relative to electrons positioned about the interior;
 a porous electrode for conducting electrons and allowing sodium ions to pass therethrough and wherein electrons and sodium ions recombine to form sodium, said electrode positioned about the ion conductor that substantially conducts ions relative to electrons, said electrode capable of being at a temperature and pressure that allows sodium to vaporize; and
 an outer current collector grid for distributing electrons throughout the porous electrode, said grid positioned about and contacting the porous electrode;

transporting means for transporting liquid sodium to the ion conductor that substantially conducts ions relative to electrons of the member;

a transition piece is positioned about the interior of the tubular member and contacts the transporting means to allow liquid sodium and electrons to be transported to the transition piece from the transporting means, said transition piece divides the tubular member into a first cell and a second cell such that each first and second cell has a ion conductor that substantially conducts ions relative to electrons, a porous electrode and a grid;

supply means for supplying sodium to the transporting means;

first conducting means for conducting electrons from the transition piece, said first conducting means extending through the shell; and second conducting means for conducting electrons to the grid of the first cell, said second conducting means extending through the shell.

18. A stacked AMTEC module as described in claim 17 wherein the ion conductor that substantially conducts ions relative to electrons is beta"-alumina solid electrolyte.

* * * * *